(12) United States Patent
Takegami

(10) Patent No.: US 9,093,908 B2
(45) Date of Patent: Jul. 28, 2015

(54) BIDIRECTIONAL DC-DC CONVERTER AND METHOD OF CONTROLLING BIDIRECTIONAL DC-DC CONVERTER

(71) Applicant: TDK Corporation, Tokyo (JP)

(72) Inventor: Eiji Takegami, Tokyo (JP)

(73) Assignee: TDK Corporation (JP)

( * ) Notice: Subject to any disclaimer, the term of this patent is extended or adjusted under 35 U.S.C. 154(b) by 193 days.

(21) Appl. No.: 13/906,891

(22) Filed: May 31, 2013

(65) Prior Publication Data

US 2013/0322128 A1 Dec. 5, 2013

(30) Foreign Application Priority Data

Jun. 1, 2012 (JP) .................................. 2012-125584

(51) Int. Cl.
*H02M 3/335* (2006.01)
*H02M 1/00* (2007.01)

(52) U.S. Cl.
CPC ...... *H02M 3/33507* (2013.01); *H02M 3/33584* (2013.01); *H02M 2001/0032* (2013.01); *Y02B 70/16* (2013.01)

(58) Field of Classification Search
USPC ............... 363/15, 16, 17, 21.02, 21.06, 21.14
See application file for complete search history.

(56) References Cited

U.S. PATENT DOCUMENTS

| 7,030,596 | B1 | 4/2006 | Salerno et al. | |
| 8,374,003 | B2 | 2/2013 | Matsumoto | |
| 2007/0041225 | A1 | 2/2007 | Fahlenkamp | |
| 2008/0062724 | A1 | 3/2008 | Feng et al. | |
| 2009/0059622 | A1* | 3/2009 | Shimada et al. | ................ 363/17 |
| 2009/0079383 | A1 | 3/2009 | Fornage et al. | |
| 2009/0244934 | A1* | 10/2009 | Wang et al. | ................ 363/21.06 |
| 2011/0188269 | A1* | 8/2011 | Hosotani | .................... 363/21.06 |
| 2011/0305043 | A1 | 12/2011 | Matsumoto | |
| 2011/0310637 | A1 | 12/2011 | Takegami | |

FOREIGN PATENT DOCUMENTS

| CN | 1193486 C | 3/2005 |
| CN | 1599971 A | 3/2005 |
| CN | 202145619 U | 2/2012 |
| DE | 10 2005 038 660 A1 | 2/2007 |
| JP | 2010-206858 A | 9/2010 |
| JP | 2011-259673 A | 12/2011 |
| JP | 2012-005266 A | 1/2012 |

OTHER PUBLICATIONS

Chinese First Office Action dated Mar. 9, 2015 for Chinese Application No. 201310217178.7 wtih English translation (14 pages).

\* cited by examiner

*Primary Examiner* — Nguyen Tran
(74) *Attorney, Agent, or Firm* — Harness, Dickey & Pierce, P.L.C.

(57) ABSTRACT

A bidirectional DC-DC converter is configured with a transformer that has a first winding and a second winding, a first DC-AC converter that is provided between a first DC voltage line and the first winding, a second DC-AC converter that is provided between a second DC voltage line and the second winding, and a controller that performs a switching control operation that bidirectionally transmits DC power between the first DC voltage line and the second DC voltage line. When the bidirectional DC-DC converter is in a light load operation state, the controller provides an operation stop period that periodically stops the switching control operation so as to perform an intermittent switching control operation.

14 Claims, 4 Drawing Sheets

BIDIRECTIONAL DC-DC CONVERTER AND METHOD OF CONTROLLING BIDIRECTIONAL DC-DC CONVERTER

CROSS-REFERENCE TO RELATED APPLICATION

This application claims priority to Japanese Patent Application No. 2012-125584 filed Jun. 1, 2012 which is hereby expressly incorporated by reference herein in its entirety.

BACKGROUND

The present invention relates to a bidirectional DC-DC converter that is connected between a first DC (direct current) voltage line and a second DC voltage line and a method of controlling a bidirectional DC-DC converter. The bidirectional DC-DC converter bidirectionally transmits DC power between the first DC voltage line and the second DC voltage line. Note that the first DC voltage line is connected, for example, to an AC-DC converter that generates a DC voltage from a commercial AC (alternating current) power source. The second DC voltage line is connected, for example, to a capacitor (storage battery).

As a conventional bidirectional DC-DC converter, a bidirectional DC-DC converter has been proposed by the applicant as disclosed in Japanese patent publication No. 2010-5266 (See page 6 and FIG. 1). The bidirectional DC-DC converter (DC-DC converter) is configured with a transformer, a voltage-source power converter, a current-source power converter and a controller. Specifically, the voltage-source power converter performs power conversion by controlling a voltage that is applied to a primary side of the transformer (a primary winding). The current-source power converter performs power conversion by controlling a current that flows in a secondary side of the transformer (a secondary winding). The controller controls the voltage-source power converter and the current-source power converter. The bidirectional DC-DC converter can perform a charging operation for a capacitor (storage battery), which is connected to the current-source power converter, by generating a DC voltage based on a rail voltage (DC voltage) that is supplied to a side of the voltage-source power converter and an output operation for providing the rail voltage (DC voltage) by generating the DC voltage based on the DC voltage stored in the capacitor (storage battery).

Specifically, in the above described conventional bidirectional DC-DC converter, when the capacitor (storage battery) is charged, the voltage-source power converter generates an AC voltage by switching the rail voltage with a switching element and outputs the AC voltage to the primary winding of the transformer. As a result, the current-source power converter rectifies an AC voltage that is generated in the secondary winding of the transformer, converts the AC voltage to a DC voltage and at the same time outputs the DC voltage to the capacitor (storage battery). On the other hand, when the capacitor (storage battery) is discharged, the current-source power converter generates an AC current by switching the DC voltage, which is supplied from the capacitor (storage battery), by the switching element and outputs the AC current to the secondary winding of the transformer. As a result, the voltage-source power converter rectifies the AC current that is output from the primary winding of the transformer, converts the AC current to the DC voltage and at the same time outputs the converted DC voltage as the rail voltage.

However, the conventional bidirectional DC-DC converter can be improved. Specifically, in the conventional bidirectional DC-DC converter, even when a charging current that is supplied to the capacitor (storage battery) is low (in other words, a load of the current-source power converter is light), the controller makes the switching elements for the voltage-source power converter and the current-source power converter continuously operate at a predetermined switching cycle that is the same as when the charging current is high. Therefore, the conventional bidirectional DC-DC converter is not as efficient as desired because a switching loss (turn-on power loss and turn-off power loss) always occurs for the switching elements.

An object of the present invention is to provide a bidirectional DC-DC converter that can achieve further improved efficiency.

SUMMARY

In order to achieve the above object, a bidirectional DC-DC converter according to one aspect of the present invention includes a transformer that has a first winding and a second winding, a first DC-AC converter that is provided between a first DC voltage line and the first winding, a second DC-AC converter that is provided between a second DC voltage line and the second winding, and a controller that performs a switching control operation that bidirectionally transmits DC power between the first DC voltage line and the second DC voltage line. When the bidirectional DC-DC converter is in a light load operation state, the controller provides an operation stop period that periodically stops the switching control operation so as to perform an intermittent switching control operation.

In the bidirectional DC-DC converter according to the aspect of the present invention, the controller determines that the bidirectional DC-DC converter is in the light load operation state when a detection current value of one of the following currents is lower than a first predetermined value: a first current flowing in from the first DC voltage line, a second current flowing out to the first DC voltage line, a third current flowing in from the second DC voltage line, and a fourth current flowing out to the second DC voltage line.

In the bidirectional DC-DC converter according to the aspect of the present invention, the intermittent switching control operation has the operation stop period and an operation performance period that performs the switching control operation. When the controller performs the intermittent switching control operation, the controller maintains the detection current value as a second predetermined value and controls an average current value of the detection current value during the intermittent switching control operation by adjusting a time ratio of the operation stop period and the operation performance period.

In the bidirectional DC-DC converter according to the aspect of the present invention, when the DC power is transmitted from the first DC voltage line to the second DC voltage line, the first DC-AC converter performs a first switching operation so as to convert a first DC voltage from the first DC voltage line to a first AC voltage and output the first AC voltage to the first winding and the second DC-AC converter performs a first rectifying operation so as to convert a second AC voltage, which is generated at the second winding according to the first AC voltage at the first winding, to a second DC voltage and output the second DC voltage to the second DC voltage line. When the DC power is transmitted from the second DC voltage line to the first DC voltage line, the second DC-AC converter performs a second switching operation so as to convert a third DC voltage from the second DC voltage line to a first AC current and output the first AC current to the second winding and the first DC-AC converter performs a second rectifying operation so as to convert a second AC current, which is generated at the first winding according to the first AC current at the second winding, to a fourth DC voltage and output the fourth DC voltage to the first DC voltage line.

A bidirectional DC-DC converter according to another aspect of the present invention further includes a first current detection unit that detects one of the following current values as a first current value: a current flowing in from the first DC voltage line and a current flowing out to the second DC voltage line. When the first current value is equal to or lower than a first threshold value until reaching or exceeding a second threshold value, which is larger than the first threshold value, the controller determines that the bidirectional DC-DC converter is in the light load operation state and performs the intermittent switching control operation.

A bidirectional DC-DC converter according to another aspect of the present invention further includes a second current detection unit that detects one of the following current values as a second current value: a current flowing out to the first DC voltage line and a current flowing in from the second DC voltage line. When the second current value is equal to or lower than a third threshold value until reaching or exceeding a fourth threshold value, which is larger than the third threshold value, the controller determines that the bidirectional DC-DC converter is in the light load operation state and performs the intermittent switching control operation.

A bidirectional DC-DC converter according to yet another aspect of the present invention further includes one current detection unit that is one of the following current detection units: a current detection unit that detects current values of a current flowing in from the first DC voltage line and a current flowing out to the first DC voltage line and a current detection unit that detects current values of a current flowing in from the second DC voltage line and a current flowing out to the second voltage line. When one of the current values detected by the current detection unit is equal to or lower than a first threshold value until reaching or exceeding a second threshold value, which is larger than the first threshold value, the controller determines that the bidirectional DC-DC converter is in the light load operation state and performs the intermittent switching control operation.

In the bidirectional DC-DC converter according to the aspect of the present invention, when the bidirectional DC-DC converter is in a light load operation state, the controller provides an operation stop period that periodically stops the switching control operation so as to perform an intermittent switching control operation. When the bidirectional DC-DC converter is not in the light load operation state, the controller continuously performs the switching control operation. Thus, the bidirectional DC-DC converter is different from a conventional DC-DC converter that performs the same switching control operation when the conventional DC-DC converter is in a light load operation state and is not in the light load operation state. Therefore, the bidirectional DC-DC converter according to the present invention can avoid an occurrence of a switching loss in the operation stop period in the light load operation state. As a result, because the switching loss can decrease in the light load operation state, the efficiency of the bidirectional DC-DC converter can be improved.

In the bidirectional DC-DC converter according to the aspect of the present invention, when the DC power is transmitted from the second DC voltage line to the first DC voltage line, the controller maintains a current value of a current during the operation performance period of the intermittent switching control operation as a predetermined current value and controls an average current value of the current value during the intermittent switching control operation, which is combined the operation stop period and the operation performance period, by adjusting a time ratio of the operation stop period and the operation performance period. Therefore, the efficiency of the bidirectional DC-DC converter is further improved. The predetermined current value is, for example, a current value by which the best efficiency of power conversion is obtained when the DC power is transmitted from the second DC voltage line to the first DC voltage line.

In the bidirectional DC-DC converter according to the aspect of the present invention, when the DC power is transmitted from the first DC voltage line to the second DC voltage line, the controller maintains a current value of a current during the operation performance period of the intermittent switching control operation as a predetermined current value and controls an average current value of the current value during the intermittent switching control operation, which is combined the operation stop period and the operation performance period, by adjusting a time ratio of the operation stop period and the operation performance period. Therefore, the efficiency of the bidirectional DC-DC converter is further improved. The predetermined current value is, for example, a current value by which the best efficiency of power conversion is obtained when the DC power is transmitted from the first DC voltage line to the second DC voltage line.

In the bidirectional DC-DC converter according to the aspect of the present invention, when the first current value detected by the first current detection unit is equal to or lower than the first threshold value until reaching or exceeding the second threshold value, which is larger than the first threshold value, the controller determines that the bidirectional DC-DC converter is in the light load operation state and performs the intermittent switching control operation. Therefore, although the first current value is up and down while it is varying, it is possible to securely avoid an oscillation state in which the controller alternatively performs a normal switching control operation and the intermittent switching control operation in a short period of time. As a result, transmission of the DC power from the first DC voltage line to the second DC voltage line is stably performed.

In the bidirectional DC-DC converter according to the aspect of the present invention, when the second current value detected by the second current detection unit is equal to or lower than the third threshold value until reaching or exceeding the fourth threshold value, which is larger than the third threshold value, the controller determines that the bidirectional DC-DC converter is in the light load operation state and performs the intermittent switching control operation. Therefore, although the second current value is up and down while it is varying, it is possible to securely avoid an oscillation state in which the controller alternatively performs a normal switching control operation and the intermittent switching control operation in a short period of time. As a result, transmission of the DC power from the second DC voltage line to the first DC voltage line is stably performed.

The bidirectional DC-DC converter according to the aspect of the present invention further includes a current detection unit that is one of the following current detection units: one current detection unit that detects current values of a current flowing in from the first DC voltage line and a current flowing out to the first DC voltage line and a current detection unit that detects current values of a current flowing in from the second DC voltage line and a current flowing out to the second voltage line. Because the current detection unit detects a current that bidirectionally flows (a charging direction and a discharging direction), a configuration of the bidirectional DC-DC converter can be simple. As a result, product costs can decrease. In addition, because the bidirectional DC-DC converter can commonly use a threshold value for a current flowing in the charging direction and a current flowing in the discharging direction, labor and time for setting the threshold value can decrease.

DESCRIPTION OF EXEMPLARY EMBODIMENTS

A bidirectional DC-DC converter 1 according to an embodiment of the present invention will be explained below with reference to the drawings.

Figure 1:
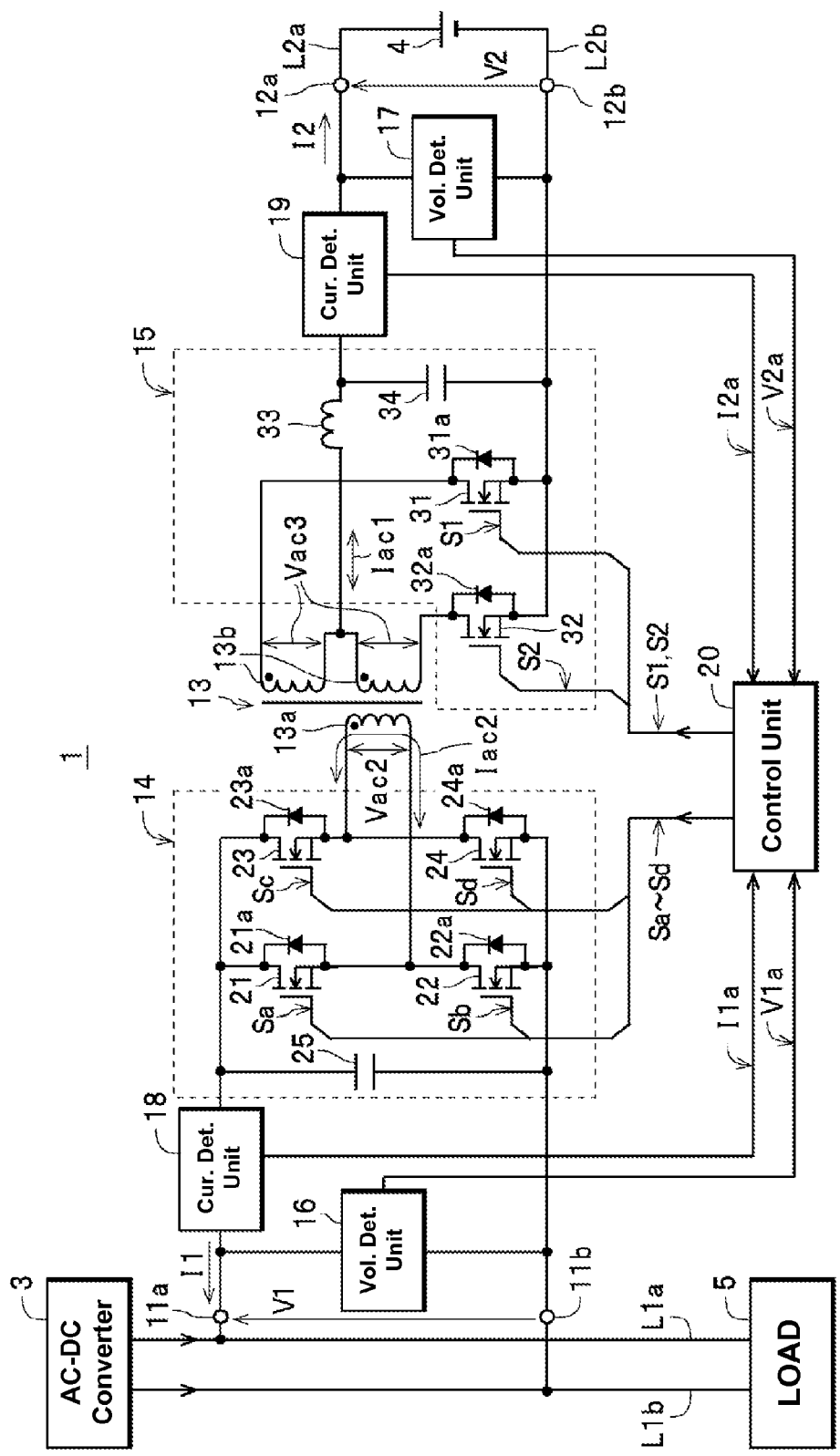
FIG. 1 is a block and circuit diagram of a bidirectional DC-DC converter 1 according to an embodiment of the present invention.
Figure 2:
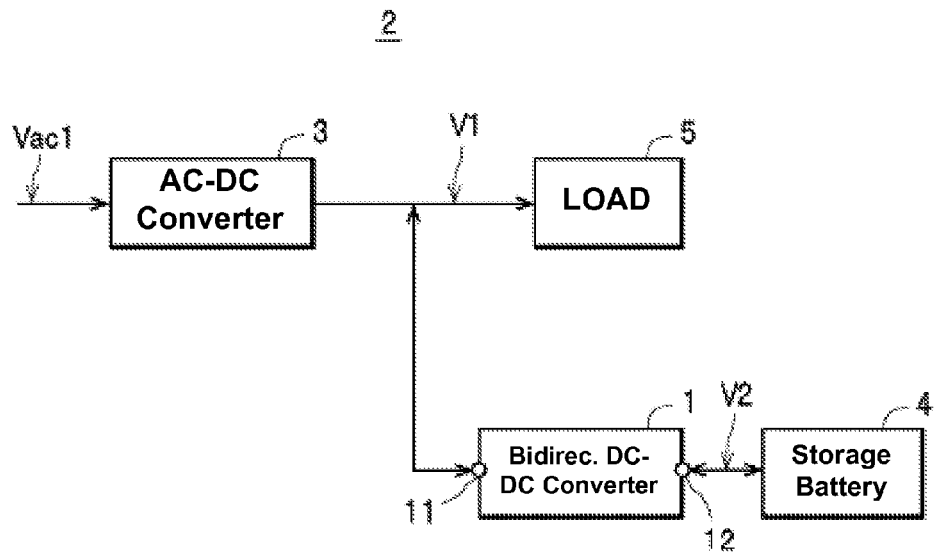
FIG. 2 is a block diagram of a power supply system 2 in which the bidirectional DC-DC converter 1 is applied according to an embodiment of the present invention.

As an example, the bidirectional DC-DC converter 1 shown in FIG. 1 is used in a power supply system 2 shown in FIG. 2. As an example, the power supply system 2 has the bidirectional DC-DC converter 1, an AC-DC converter 3 and a capacitor (storage battery) 4 as shown in FIG. 2. The power supply system 2 generates a first DC voltage V1 based on an AC voltage Vac1 that is output from a commercial AC power source (not shown) and supplies the first DC voltage V1 to a load 5. The load 5 can be, for instance, an electronic device and a direct current motor, which are operated by a DC voltage, or another capacitor (storage battery).

First, an operation of each component of the power supply system 2 is explained with reference to FIGS. 1 and 2.

In the power supply system 2, when the AC voltage Vac1 within a predetermined range of a voltage value (predetermined voltage value range) is supplied to the AC-DC converter 3 from the commercial AC power source (not shown), the AC-DC converter 3 performs a voltage conversion (AC-DC conversion) in which the AC voltage Vac1 that is input is converted into the first DC voltage V1 that is a predetermined voltage value (a reference (target) voltage value V1ref on a high-voltage side). At the same time, the AC-DC converter 3 outputs the first DC voltage V1 to the load 5 through first DC voltage lines L1a and L1B. When the first DC voltage lines L1a and L1b do not need to be distinguished, these can also be referred to as a first DC voltage line L1. Further, the AC-DC converter 3 outputs the first DC voltage V1 to the bidirectional DC-DC converter 1 in which first input and output terminals 11a and 11b are connected to the first DC voltage lines L1a and L1b. When the first input and output terminals 11a and 11b do not need to be distinguished, these can also be referred to as a first input and output terminal 11). The bidirectional DC-DC converter 1 performs a voltage conversion (DC-DC conversion) in which the first DC voltage V1 that is input from the first input and output terminal 11 is converted so as to generate a second DC voltage V2. At the same time, the bidirectional DC-DC converter 1 outputs the second DC voltage V2 to the storage battery 4 from the second input and output terminals 12a and 12b through second DC voltage lines L2a and L2b to which second input and output terminals 12a and 12b are connected. Specifically, when the second input and output terminals 12a and 12b do not need to be distinguished, these can also be referred to as a second input and output terminal 12. Further, when the second DC voltage lines L2a and L2b do not need to be distinguished, these can also be referred to as a second DC voltage line L2. As a result, the bidirectional DC-DC converter 1 charges the storage battery 4 to a predetermined voltage value (a reference (target) voltage value V2ref on a low-voltage side). In other words, the bidirectional DC-DC converter 1 performs a charging operation for the storage battery 4.

On the other hand, when the voltage value of the AC voltage Vac1 that is supplied from the commercial AC power source to the AC-DC converter 3 is lower than the above predetermined voltage value range, the voltage value of the first DC voltage V1 that is output from the AC-DC converter 3 also decreases. That is, the voltage value of the first DC voltage V1 that is output from the AC-DC converter 3 to the load 5 does not reach the reference voltage value V1ref. In this case, the bidirectional DC-DC converter 1 converts the DC power (the second DC voltage V2), which is stored in the storage battery 4 and which is supplied to the second input and output terminal 12 through the second DC voltage line L2. As a result, because the bidirectional DC-DC converter 1 outputs the converted DC power to a side of the AC-DC converter 3 (specifically, the load 5) through the first DC voltage line L1 from the first input and output terminal 11, the voltage value of the first DC voltage V1 increase to approach to the reference voltage value V1ref (Specifically, a discharging operation for the storage battery 4 is performed). As a result, even when a voltage value of the AC voltage Vac1 is lower than the above predetermined voltage value range, an output of the first DC voltage V1 of the prescribed voltage value V1ref to the load 5 is continued.

Next, the bidirectional DC-DC converter 1 according to an embodiment of the present invention will be explained with reference to FIG. 1.

First, a configuration of the bidirectional DC-DC converter 1 will be explained. The bidirectional DC-DC converter 1 is configured with the first input and output terminal 11, the second input and output terminal 12, a transformer 13, a first DC-AC converter 14, a second DC-AC converter 15, voltage detection units 16 and 17, current detection units 18 and 19, and a control unit 20. As explained above, the bidirectional DC-DC converter 1 is connected between the first DC voltage line L1 (a side of the AC-DC converter 3) and the second DC voltage line L2 (a side of the storage battery 4) and bidirectionally transmits the DC power between the first DC voltage line L1 and the second DC voltage line L2. Further, according to the current detection units 18 and 19, as explained below, both of a construction in which either of the current detection units 18 and 19 is used and a construction in which both the current detection units 18 and 19 are used can be adopted.

The transformer 13 has, for example, a first winding 13a and a second winding 13b that are electrically isolated each other. Further, a center tap is provided at the second winding 13b.

As shown in FIG. 1, the first DC-AC converter 14 corresponds to a voltage-source power converter and is located between the AC-DC converter 3 and the first winding 13a. Specifically, the first DC-AC converter 14 is located between the first input and output terminal 11, to which the AC-DC converter 3 and the load 5 connect, and the first winding 13a. Further, as an example, the first DC-AC converter 14 is configured with switching elements 21, 22, 23 and 24 that are connected with a full bridge form and a capacitor 25. In the embodiment of the present invention, the switching elements 21, 22, 23 and 24 correspond to N-channel MOSFETs (metal-oxide-semiconductor field-effect transistor). In this case, the capacitor 25 is connected between the first input and output terminals 11a and 11b.

The switching elements 21 and 22 are connected in series with each other because a source terminal of the switching element 21 and a drain terminal of the switching element 22 are connected. Further, a drain terminal of the switching element 21 is connected to the first input and output terminal 11a and a source terminal of the switching element 22 is connected to the first input and output terminal 11b. As a result, a series circuit of the switching elements 21 and 22 is connected between the first input and output terminals 11a and 11b.

Similarly, the switching elements 23 and 24 are connected in series with each other because a source terminal of the switching element 23 and a drain terminal of the switching element 24 are connected. Further, a drain terminal of the switching element 23 is connected to the first input and output terminal 11a and a source terminal of the switching element 24 is connected to the first input and output terminal 11b. As a result, a series circuit of the switching elements 23 and 24 is connected between the first input and output terminals 11a and 11b and in parallel to the series circuit of the switching elements 21 and 22. Further, one end of the first winding 13a of the transformer 13 is connected to a node connecting the source terminal of the switching element 21 and the drain terminal of the switching element 22. Further, another end of the first winding 13a of the transformer 13 is connected to a node connecting the source terminal of the switching element 23 and the drain terminal of the switching element 24.

As shown in FIG. 1, the second DC-AC converter 15 corresponds to a current-source power converter and is located between the second winding 13b and the storage battery 4. Specifically, the second DC-AC converter 15 is located between the second input and output terminal 12, which is connected to the storage battery 4, and the second winding 13b. Further, as an example, the second DC-AC converter 15 is configured with switching elements 31 and 32, which are connected each other through the second wingding 13b, an inductor 33 and a capacitor 34. In the embodiment of the present invention, the switching elements 31, 32 correspond to N-channel MOSFETs.

In this case, each source terminal of the switching elements 31 and 32 is connected to the second input and output terminal 12b. Further, a drain terminal of the switching element 31 is connected to one end of the second winding 13b. A drain terminal of the switching element 32 is connected to another end of the second winding 13b. One end of the inductor 33 is connected to the center tap of the second winding 13b and another end of the inductor 33 is connected to the second input and output terminal 12a. The capacitor 34 is connected between another end of the inductor 33 and the second input and output terminal 12b.

The voltage detection unit 16 is connected between the first input and output terminals 11a and 11b and detects a voltage value Via of the first DC voltage V1. The voltage detection unit 16 outputs the voltage value Via of the first DC voltage V1 to the control unit 20. Further, the voltage detection unit 17 is connected between the second input and output terminals 12a and 12b and detects a voltage value V2a of the second DC voltage V2. The voltage detection unit 17 outputs the voltage value V2a of the second DC voltage V2 to the control unit 20.

As an example, the current detection unit 18 is provided between the first input and output terminal 11a and a terminal, which is located at a side of the first input and output terminal 11a, of the capacitor 25. Further, the current detection unit 18 detects a current value I1a of a current I1 that flows between the bidirectional DC-DC converter 1 and the first DC voltage line L1 and outputs the current value I1a to the control unit 20. In this case, when the current detection unit 18 according to the present embodiment detects the current value I1a (a first discharging current value) of the current I1 (a first discharging current that flows out to the first DC voltage line L1 during a discharging operation) that flows in a direction of the arrow shown in FIG. 1 as a second current value, the current detection unit 18 functions as a second current detection unit. When the current detection unit 18 detects the current value I1a (a first charging current value) of the current I1 (a first charging current that flows in from the first DC voltage line L1 during a charging operation) that flows in an opposite direction of the arrow shown in FIG. 1 as a first current value, the current detection unit 18 functions as a first current detection unit.

As an example, the current detection unit 19 is provided between another terminal of the inductor 33 and the second input and output terminal 12a. Further, the current detection unit 19 detects a current value I2a of a current I2 that flows between the bidirectional DC-DC converter 1 and the second DC voltage line L2 and outputs the current value I2a to the control unit 20. In this case, when the current detection unit 19 according to the present embodiment detects the current value I2a (a second charging current value) of the current I2 (a second charging current that flows out to the second DC voltage line L2 during the charging operation) that flows in a direction of the arrow shown in FIG. 1 as the first current value, the current detection unit 19 functions as the first current detection unit. When the current detection unit 19 detects the current value I2a (a second discharging current value) of the current I2 (a second discharging current that flows in from the second DC voltage line L2 during the discharging operation) that flows in an opposite direction of the arrow shown in FIG. 1 as the second current value, the current detection unit 19 functions as the second current detection unit.

The control unit 20 is configured with, for example, a DSP (digital signal processor) and performs a switching control operation for the first DC-AC converter 14 and the second DC-AC converter 15 based on one of the voltage value Via of the first DC voltage V1 that is detected by the voltage detection unit 16, the voltage value V2a of the second DC voltage V2 that is detected by the voltage detection unit 17, the current value I1a (the first discharging current value or the first charging current value) of the current I1 that is detected by the current detection unit 18 and the current value I2a (the second discharging current value or the second charging current value) of the current I2 that is detected by the current detection unit 19. When the control unit 20 performs the switching control operation for the first DC-AC converter 14 and the second DC-AC converter 15, the control unit 20 generates and outputs gate driving signals Sa, Sb, Sc and Sd for the switching elements 21, 22, 23 and 24, respectively, and gate driving signals S1 and S2 for switching elements 31 and 32, respectively, by a PWM method (pulse width modulation). Note that as discussed above, the first DC-AC converter 14 is configured with the switching elements 21, 22, 23 and 24. The second DC-AC converter 15 is configured with the switching elements 31 and 32. Further, the PWM method, for instance, corresponds to a method in which a pulse width (a duty ratio) is changed while maintaining a frequency to be tens of kHz.

Further, as explained above, when the current detection units 18 and 19 have constructions (the constructions are for functioning as the first current detection unit and the second current detection unit) for detecting a current value of a current (a charging current and a discharging current) that bidirectionally flows and when the bidirectional DC-DC converter 1 has one of the current detection units 18 and 19, the control unit 20 can perform the switching control operation for the first DC-AC converter 14 and the second DC-AC converter 15 based on the current value of the current (the charging current and the discharging current) that are detected by the one of the current detection units. In other words, when the control unit 20 has only the current detection unit 18, the switching control operation is performed based on the current value I1$a$ (the first discharging current value or the first charging current value). Similarly, when the control unit 20 has only the current detection unit 19, the switching control operation is performed based on the current value I2$a$ (the second discharging current value or the second charging current value).

Figure 3:
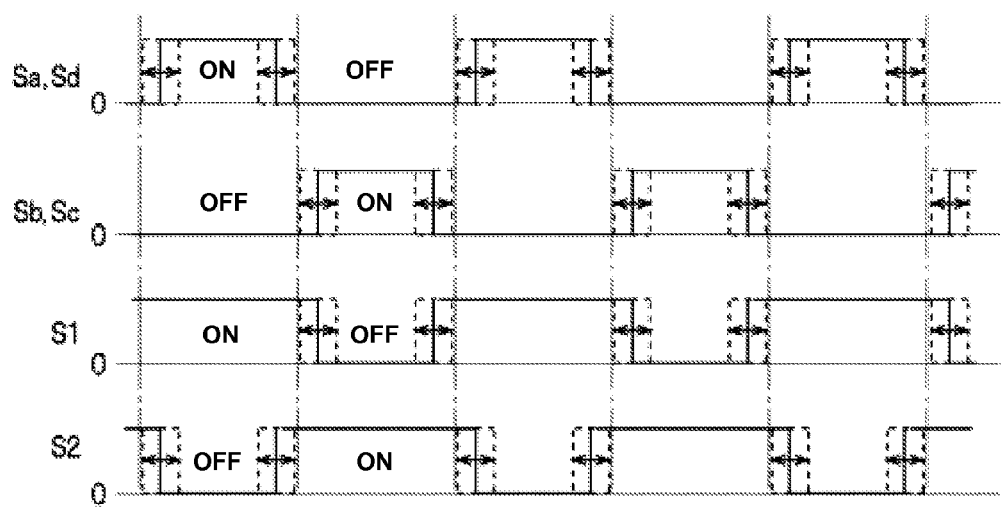
FIG. 3 is a wave form diagram of each gate driving signal Sa-Sd, S1 and S2 in order to explain an operation of the bidirectional DC-DC converter 1 according to an embodiment of the present invention.

The generation of the gate driving signals Sa-Sd according to the embodiment of the present invention is shown in FIG. 3. In FIG. 3, the control unit 20 generates the gate driving signals Sa and Sb by the PWM method. Phases of the gate driving signals Sa and Sb are different from each other at 180° degree. The control unit 20 outputs the gate driving signal Sa to a gate terminal of the switching element 21 and outputs the gate driving signal Sa to a gate terminal of the switching element 24 as the gate driving signal Sd. Further, the control unit 20 outputs the gate driving signal Sb to a gate terminal of the switching element 22 and outputs the gate driving signal Sb to a gate terminal of the switching element 23 as the gate driving signal Sc. In this case, the control unit 20 generates the gate driving signals Sa and Sb so that all of the switching elements 21-24 are not in ON states at the same time by not overlapping the ON periods with one another. On the other hand, with respect to the generation of the gate driving signals S1 and S2 according to an embodiment of the present invention, the control unit 20 generates a signal by inverting the gate driving signal Sb and submits the inverted signal to a gate terminal of the switching element 31 as the gate driving signal S1. Further, the control unit 20 generates a signal by inverting the gate driving signal Sa and outputs the inverted signal to a gate terminal of the switching element 32 as the gate driving signal S2. According to this configuration, the control unit 20 generates the gate driving signals S1 and S2 by partially overlapping each ON period with another (at parts of the periods of a rising phase and a falling phase).

Further, with respect to a converter in general, including the bidirectional DC-DC converter 1, it has been known that power conversion efficiency of a converter varies due to changes of a loss by a transformer coil, a loss by a switching element and a loss by a circuit pattern according to a current value of an output current. Further, it has also been known that each converter has its own output current value that achieves the best power conversion efficiency. The bidirectional DC-DC converter 1 has a value (an optimum value) of the current value I2$a$ of the current I2 that achieves the best power conversion efficiency when the DC power is transmitted from the first DC voltage line L1 to the second DC voltage line L2 (at the time of charging according to the embodiment). Further, the bidirectional DC-DC converter 1 also has a value (an optimum value) of the current value I1$a$ of the current I1 that achieves the best power conversion efficiency when the DC power is transmitted from the second DC voltage line L2 to the first DC voltage line L1 (at the time of discharging according to the embodiment). These optimum values can be obtained beforehand by experiments or a simulation.

In the bidirectional DC-DC converter 1 of the present embodiment, when the control is performed based on the current value I2$a$ that is detected by the current detection unit 19, the optimum value (for instance, 4 A) of the current value I2$a$ (the second charging current value) of the current I2 at the time of charging and the optimum value (for instance, 3.8 A) of the current value I2$a$ (the second discharging current value) of the current I2 at the time of discharging are obtained beforehand. As a result, each of the optimum values is stored in the control unit 20 as a determined current value for the current I2. Further, when the control is performed based on the current value I1$a$ that is detected by the current detection unit 18, the optimum value (for instance, 1 A) of the current value I1$a$ (the first charging current value) of the current I1 at the time of charging and the optimum value (for instance, 1 A) of the current value I1$a$ (the first discharging current value) of the current I1 at the time of discharging are obtained beforehand. As a result, each of the optimum values is stored in the control unit 20 as a predetermined current value for the current I1.

Next, an operation of the bidirectional DC-DC converter 1 in the power supply system 2 will be explained below.

In the bidirectional DC-DC converter 1 of the present embodiment, in a normal operation mode, the control unit 20 continuously generates and outputs each of the gate driving signals Sa, Sb, Sc and Sd according to a time chart shown in FIG. 3 to each of the switching elements 21, 22, 23 and 24 of the first DC-AC converter 14, respectively. Further, under a normal operation mode, the control unit 20 continuously generates and outputs each of the gate driving signals S1 and S2 according to a time chart shown in FIG. 3 to each of the switching elements 31 and 32 of the second DC-AC converter 15, respectively. Thereby, each of the switching elements 21, 22, 23, 24, 31 and 32 performs ON and OFF operations in synchronization with the gate driving signals Sa, Sb, Sc, Sd, S1 and S2, respectively. In this state, when the DC power is transmitted from the first DC voltage line L1 (the AC-DC converter 3) to the second DC voltage line L2 (the storage battery 4) (a charging direction), the bidirectional DC-DC converter 1 operates as a voltage-source DC-DC converter. On the other hand, when the DC power is transmitted from the second DC voltage line L2 (the storage battery 4) to the first DC voltage line L1 (the AC-DC converter 3) (a discharging direction), the bidirectional DC-DC converter 1 operates as a current-source DC-DC converter.

Figure 4:
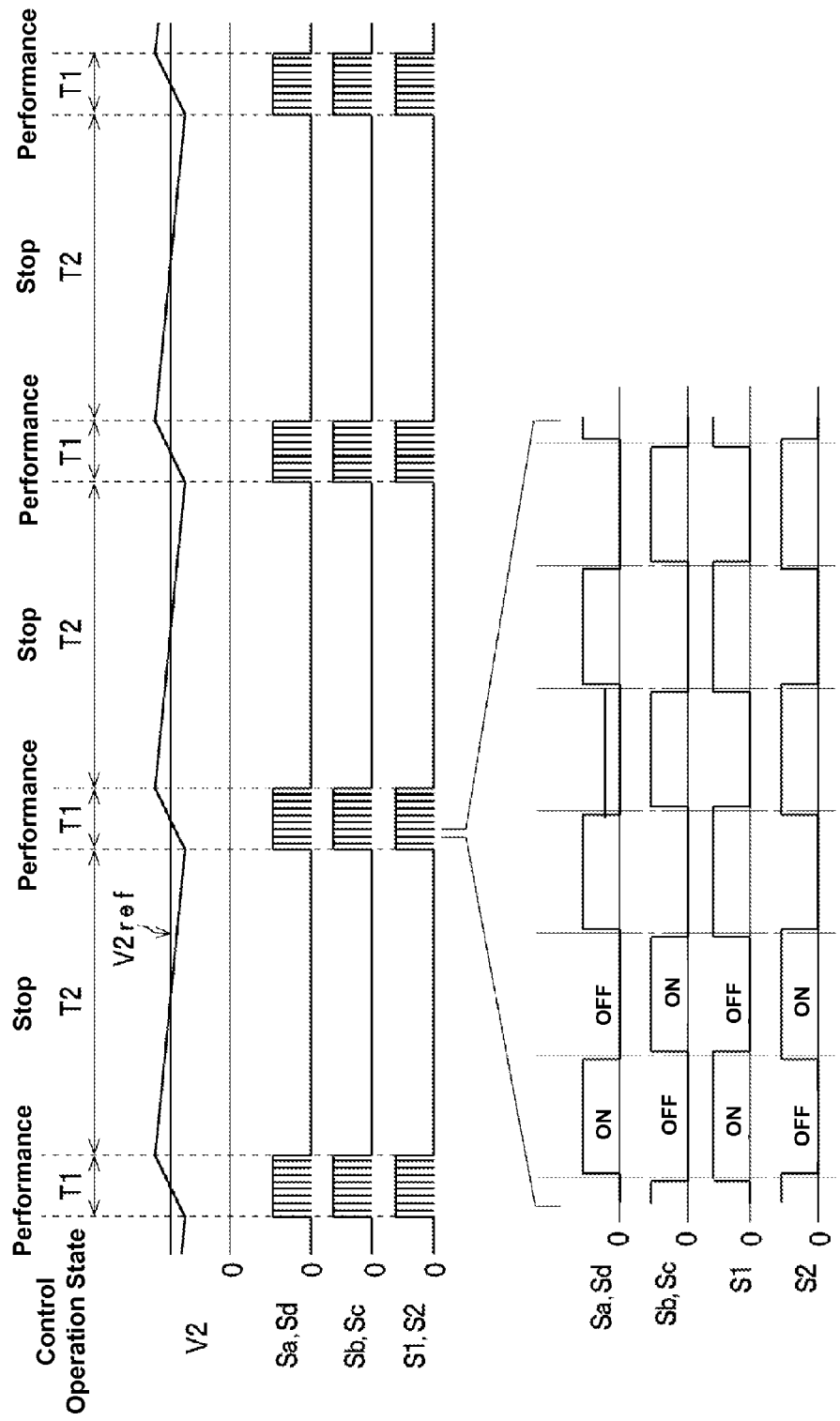
FIG. 4 is a wave form diagram of a charging operation in an intermittent switching control operation of the bidirectional DC-DC converter 1 according to an embodiment of the present invention.

In the bidirectional DC-DC converter 1, when the DC power that is transmitted from the first DC voltage line L1 (the AC-DC converter 3) to the second DC voltage line L2 (the storage battery 4) increases (when a state shifts from a discharging operation state to a charging operation state, and when the DC power, which is transmitted to the second DC voltage line L2, increases in the charging operation state), the control unit 20 performs the switching control operation as shown in a lower diagram in FIG. 4. Such switching control operation is to widen the pulse widths (to increase a duty ratio) of each of the gate driving signals Sa, Sb, Sc and Sd. With respect to each of the gate driving signals S1 and S2, such switching control operation is to decrease an overlap of ON periods.

Specifically, the first DC-AC converter 14 converts the first DC voltage V1 from the AC-DC converter 3 to the AC voltage Vac2 and outputs the AC voltage Vac2 to the first winding 13a by switching each of the switching elements 21, 22, 23 and 24. Thus, the first DC-AC converter 14 performs a switching operation. In the second DC-AC converter 15, each of the switching elements 31 and 32 and each of the body diodes 31a and 32a function, respectively, as a rectifying device. An AC voltage Vac3 is generated in the second winding 13b in accordance with the AC voltage Vac2 that is provided in the first winding 13a. The second DC-AC converter 15 rectifies the AC voltage Vac3, converts the AC voltage Vac3 to the second DC voltage V2, and outputs the second DC voltage V2 to the storage battery 4. Thus, the second DC-AC converter 15 performs a rectifying operation. In other words, when the bidirectional DC-DC converter 1 performs the charging operation, the control unit 20 continuously performs the switching control operation including the switching operation and the rectifying operation. In the switching operation, the first DC-AC converter 14 converts the first DC voltage V1 to the AC voltage Vac2 by switching the first DC voltage V1 and outputs the AC voltage Vac2 to the first winding 13a. In the rectifying operation, the second DC-AC converter 15 rectifies the AC voltage Vac3 generated in the second winding 13b, converts the AV voltage Vac3 to the second DC voltage V2, and outputs the second DC voltage V2 to the storage battery 4.

In this charging operation, the control unit 20 determines a target current value of the current I2 for which the second DC voltage V2 that is detected by the voltage detection unit 17 is required to approach to the reference voltage value V2ref. Then, the control unit 20 controls the duty ratio for each of the gate driving signals Sa, Sb, Sc and Sd so as to make the current value I2a (the second charging current value) of the current I2 that is detected by the current detection unit 19 close to the target current value. In the above case, the target current value of the current I2 is limited to a predetermined current value or less. The predetermined current value corresponds to a current value of a charging current that is set according to the storage battery 4. Therefore, when a charging level of the storage battery 4 is low, the storage battery 4 is charged by a constant current because the second DC voltage V2 is lower than the reference voltage value V2ref. Further, when the control unit 20 controls based on the current value I1a (the first charging current value) that is detected by the current detection unit 18, the control unit 20 determines the target current value of the current I1 for which the voltage value V2a of the second DC voltage V2 that is detected by the voltage detection unit 17 is required to approach to the reference voltage value V2ref. Then, the control unit 20 controls the duty ratio for each of the gate driving signals Sa, Sb, Sc and Sd so as to make the current value I1a (the first charging current value) that is detected by the current detection unit 18 close to the target current value.

Figure 5:
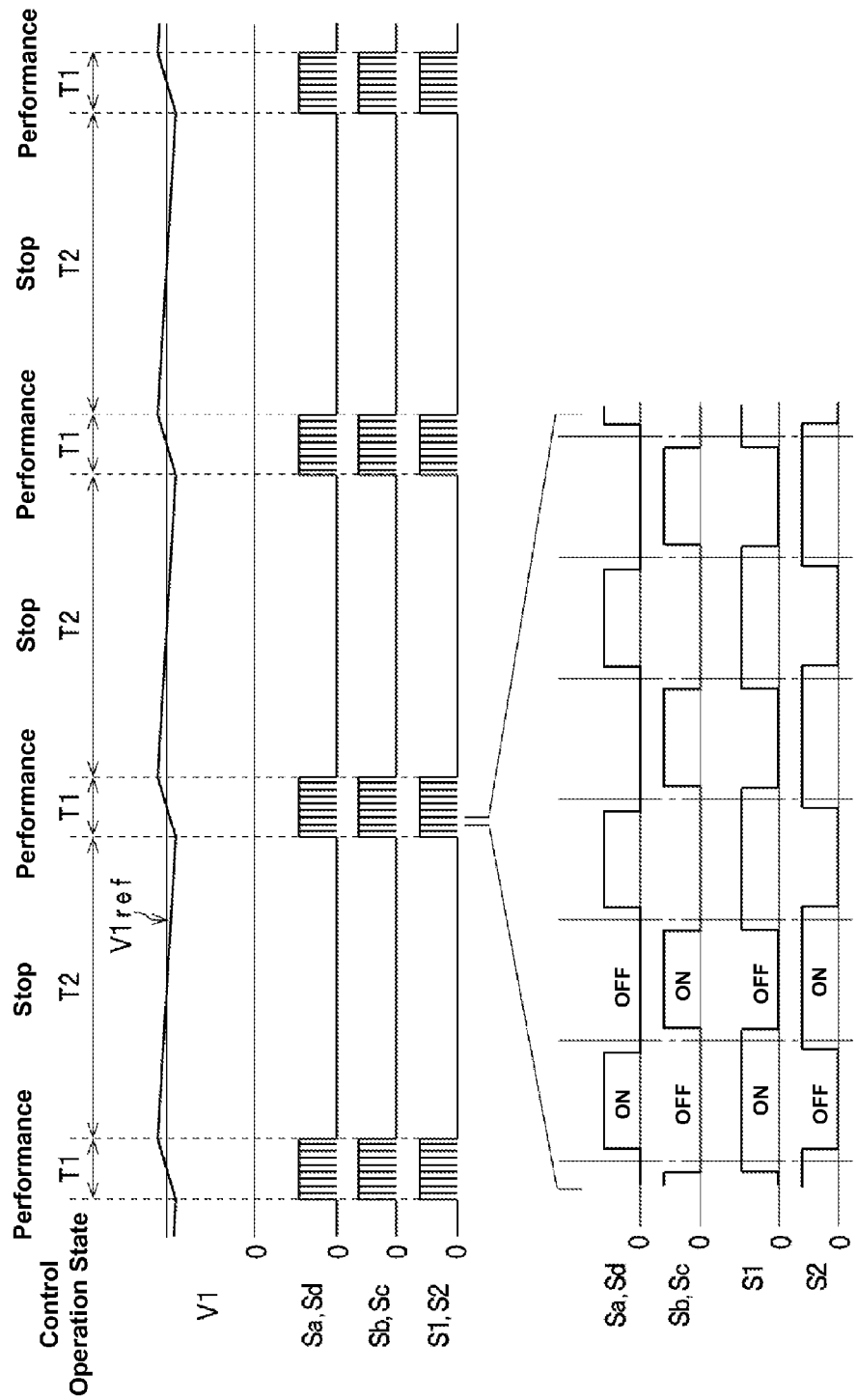
FIG. 5 is a wave form diagram of a discharging operation in an intermittent switching control operation of the bidirectional DC-DC converter 1 according to an embodiment of the present invention.

On the other hand, in the bidirectional DC-DC converter 1, when the DC power that is transmitted from the second DC voltage line L2 (the storage battery 4) to the first DC voltage line L1 (the load 5) increases (when a state shifts from the charging operation state to the discharging operation state, and when the DC power, which is transmitted to the first DC voltage line L1, increases in the discharging operation state), the control unit 20 performs the switching control operation as shown in a lower diagram in FIG. 5. Such switching control operation is to widen the pulse widths (to increase a duty ratio) of each of the gate driving signals S1 and S2 and to increase an overlap of the ON periods of the gate driving signals S1 and S2.

Specifically, the second DC-AC converter 15 generates an AC current Iac1 in the second winding 13b switching the second DC voltage V2 from the storage battery 4 by each of the switching elements 31 and 32. Thus, the second DC-AC converter 15 performs a switching operation. In the first DC-AC converter 14, each of the switching elements 21-24 and each of the body diodes 21a, 22a, 23a and 24a function, respectively, as a rectifying device. An AC current Iac2 is generated in the first winding 13a in accordance with the AC current Iac1 that is provided in the second winding 13b. The first DC-AC converter 14 rectifies the AC current Iac2 and outputs the AC current Iac2 to the capacitor 25 (the capacitor 25 is charged). Thus, the first DC-AC converter 14 converts the AC current Iac2 to the first DC voltage V1 and outputs it to the first DC voltage line L1 (specifically, to the load 5 that is connected to the first DC voltage line L1). Thus, the first DC-AC converter 14 performs a rectifying operation. In other words, when the bidirectional DC-DC converter 1 performs the discharging operation, the control unit 20 continuously performs the switching control operation including the switching operation and the rectifying operation. In the switching operation, the second DC-AC converter 15 generates the AC current Iac1 in the second winding 13b by switching the second DC voltage V2. In the rectifying operation, the first DC-AC converter 14 generates the first DV voltage V1 by rectifying the AC current Iac2 generated in the first winding 13a and output the first DC voltage V1 to the load 5.

As explained above, in this charging operation, each of the switching elements 31 and 32 is operated by the gate driving signals S1 and S2 in which the ON periods overlap each other (the signals shown by solid lines in FIG. 3). For this reason, when both the switching elements 31 and 32 are in ON states at the same time, electric power (energy) is stored in the inductor 33. Thereafter, when only one of the switching elements 31 and 32 is in the ON state, the DC electric power (energy) that is stored in the inductor 33 is supplied to a side of the first winding 13a through the second winding 13b. Therefore, the AC current Iac2 is generated in the first winding 13a. The control unit 20 determines the target current value of the current I2 for which the voltage value V1a of the first DC voltage V1 that is detected by the voltage detection unit 16 is required to approach to the reference voltage value V1ref. Then, the control unit 20 adjusts a state of overlapping of the ON periods of the gate driving signals S1 and S2 by changing the duty ratio for each of the gate driving signals S1 and S2 so as to make the current value I2a (the second discharging current value) of the current I2 that is detected by the current detection unit 19 close to the target current value. As a result, a voltage value of the first DC voltage V1 that is supplied to the load 5 is maintained as the reference voltage value V1ref. Further, when the control unit 20 controls based on the current value I1a (the first discharging current value) that is detected by the current detection unit 18, the control unit 20 determines the target current value of the current I1 for which the voltage value V1a of the first DC voltage V1 that is detected by the voltage detection unit 16 is required to approach to the reference voltage value V1ref. Then, the control unit 20 adjusts a state of overlap of the ON periods of the gate driving signals S1 and S2 by changing the duty ratio for each of the gate driving signals S1 and S2 so as to make the current value I1a (the first discharging current value) that is detected by the current detection unit 18 close to the target current value.

On the other hand, when a voltage of the storage battery 4 reaches the reference voltage value V2ref during the charging operation, the current value I2a (the second charging current value) of the current I2 that is detected by the current detection unit 19 decreases. Further, when the load 5 becomes light during the discharging operation, the current value I2a (the second discharging current value) of the current I2 that is detected by the current detection unit 19 decrease. In these cases, the bidirectional DC-DC converter 1 shifts from the normal operation mode as explained above to an intermittent operation mode. The intermittent operation mode will be explained below.

First, an operation when the current value I2a (the second charging current value) of the current I2 decreases during the charging operation is explained. In this case, when the current value I2a (the second charging current value) of the current I2 is equal to or lower than a predetermined first threshold value Ith1 (for instance, 1 A) because of lowering the current value I2a until reaching or exceeding a predetermined second threshold value Ith2 (for instance, 2 A), which is larger than the predetermined first threshold value Ith1, because of increasing the current value I2a, the control unit 20 determines that the bidirectional DC-DC converter 1 is in a light load operation state (a state in which a charging current is less) and shifts to the intermittent operation mode in which the above switching control operation is intermittently performed. Further, when the control is performed based on the current value I1a (the first charging current value) of the current I1 that is detected by the current detection unit 18, a first threshold value Ith1 and a second threshold value Ith2 are set for the current value I1a (the first charging current value) of the current I1 during the charging operation.

With respect to the intermittent operation mode during the charging operation, unlike the normal operation mode that continuously performs the switching control operation, a period T2 (stop period) that corresponds to a period for stopping the switching control operation is provided between each period T1 (performance period) that corresponds to a period for performing the switching control operation as shown in an upper diagram of FIG. 4. Further, the switching loss is decreased throughout an entire period that corresponds to the sum of the period T1 (performance period) and the period T2 (stop period). As a result, the efficiency of the bidirectional DC-DC converter 1 at the time of charging is improved.

In this case, the control unit 20 maintains the current value I2a of the current I2 in the period T1 as a current value (an optimum value at the time of charging and it is 4 A according to the embodiment) that is stored beforehand. At the same time, the control unit 20 controls a mean current value of the current I2 in an combined period that corresponds to the sum of the period T1 and the period T2 by controlling a ratio of lengths of the period T1 and the period T2. Specifically, when the control unit 20 determines that the target current value, which is required to maintain a voltage value of the second DC voltage V2 as close as possible to the reference voltage V2ref, of the current I2 is 0.4 A, the control unit 20 controls the mean current value of the current I2 in the combined period that corresponds to the sum of the period T1 and the period T2 as 0.4 A (=4 A/10) by adjusting a ratio of the lengths of the period T1 and the period T2 to 1:9. On the other hand, when the control unit 20 determines that the target current value of the current I2 is 0.8 A, the control unit 20 controls the mean current value of the current I2 in the combined period that corresponds to the sum of the period T1 and the period T2 as 0.8 A (=4 A/5) by regulating the ratio of the lengths of the period T1 and the period T2 to 1:4. Further, when the control is performed based on the current value I1a (the first charging current value) of the current I1 that is detected by the current detection unit 18, the control is performed so that the current value I1a (the first charging current value) in the period T1 becomes an optimum value at the time of charging (for instance, 1 A).

As discussed above, in the period T1 of the intermittent operation mode during the charging operation, the bidirectional DC-DC converter 1 operates in a state where the current value I2a (the second charging current value) of the current I2 is maintained to be the current value (4 A) that makes the efficiency of power conversion of the bidirectional DC-DC converter 1 the most. Thereby, the bidirectional DC-DC converter 1 transmits the DC power from the first DC voltage line L1 to the second DC voltage line L2. As a result, the efficiency of the bidirectional DC-DC converter 1 further increases in the intermittent operation mode during the charging operation.

Next, the operation when the current value I2a (the second discharging current value) of the current I2 decreases during the discharging operation is explained. In this case, when the current value I2a (the second discharging current value) is equal to or lower than a predetermined third threshold value Ith3 (for instance, 0.8 A) because of lowering the current value I2a (the second discharging current value) until reaching or exceeding a predetermined fourth threshold value Ith4 (for instance, 1.8 A), which is larger than the predetermined third threshold value Ith3, because of increasing the current value I2a, the control unit 20 determines that the bidirectional DC-DC converter 1 is in the light load operation state (a state in which a discharging current is less) and shifts to the intermittent operation mode in which the above switching control operation is intermittently performed. Further, when the control is performed based on the current value I1a (the first charging current value) of the current I1 that is detected by the current detection unit 18, a third threshold value Ith3 and a fourth threshold value Ith4 are set for the current value I1a (the first charging current value) of the current I1 during the discharging operation.

With respect to the intermittent operation mode during the discharging operation, a period T2 (stop period) that corresponds to a period for stopping the switching control operation is provided between each period T1 (performance period) that corresponds to a period for performing the switching control operation as shown in an upper diagram of FIG. 5 that is similar to the intermittent operation mode during the charging operation. Further, the switching loss is decreased throughout an entire period that corresponds to the sum of the period T1 (performance period) and the period T2 (stop period). As a result, the efficiency of the bidirectional DC-DC converter 1 at the time of discharging is improved.

In this case, the control unit 20 maintains the current value I2a of the current I2 in the period T1 as a current value (an optimum value at the time of discharging and it is 3.8 A according to the embodiment) that is stored beforehand. At the same time, the control unit 20 controls a mean current value of the current I2 in the combined period that corresponds to the sum of the period T1 and the period T2 by controlling a ratio of a lengths of the period T1 and the period T2. Specifically, when the control unit 20 determines the target current value, which is required to maintain a voltage value of the first DC voltage V1 as close as possible to the reference voltage V1ref, of the current I2, the control unit 20 controls the mean current value of the current I2 in the combined period that corresponds to the sum of the period T1 and the period T2 by adjusting a ratio of the lengths of the period T1 and the period T2 that is similar to the control for the intermittent operation mode during the charging operation. Further, when the control is performed based on the current value I1a (the first discharging current value) of the current I1 that is detected by the current detection unit 18, the control is performed so that the current value I1*a* (the first discharging current value) in the period T1 becomes an optimum value at the time of discharging (for instance, 1 A).

As discussed above, in the period T1 of the intermittent operation mode during the discharging operation, the bidirectional DC-DC converter 1 operates in a state where the current value I2*a* (the second discharging current value) of the current I2 is maintained to be the current value (3.8 A) that makes the efficiency of power conversion of the bidirectional DC-DC converter 1 the most. Thereby, the bidirectional DC-DC converter 1 transmits the DC power from the second DC voltage line L2 to the first DC voltage line L1. As a result, the efficiency of the bidirectional DC-DC converter 1 further increases in the intermittent operation mode during the discharging operation.

As explained above, in the bidirectional DC-DC converter 1, when the bidirectional DC-DC converter 1 is in a light load operation state, the control unit 20 intermittently performs the switching control operation by providing the period T2 (stop period) that periodically stops the switching control operation as shown in FIGS. 4 and 5. Specifically, the light load state corresponds to a state in which the current that flows out to the second DC voltage line L2 or the current that is flown in from the second DC voltage line L2 are decreased (the state where the current becomes low). Further, the light load state also corresponds to a state where the current that flows out to the first DC voltage line L1 or the current that is flown in from the first DC voltage line L1 are decreased (the state where the current becomes low). Therefore, the bidirectional DC-DC converter 1 can avoid an outbreak of the switching loss in the stop period in the light load state because the configuration of the bidirectional DC-DC converter 1 is different from the configuration by which the switching control operation is continuously performed in the light load state as well as in the non-light load state. Therefore, the switching loss in the light load state can be decreased. As a result, the efficiency of the bidirectional DC-DC converter 1 can sufficiently be improved.

Further, in the bidirectional DC-DC converter 1, when the control unit 20 performs the control based on the current value I2*a* (the second charging current value) of the current I2 that is detected as the first current value by the current detection unit 19 and flows out to the second DC voltage line L2 in the period T1 in the intermittent operation mode during the charging operation, the control unit 20 controls the ratio of the lengths of the period T1 and the period T2 and drives each of the switching elements 21, 22, 23 and 24 while the current value I2*a* (the second charging current value) of the current I2 is maintained to be the current value (4 A) that makes the efficiency of power conversion of the bidirectional DC-DC converter 1 the most at the charging operation. Thereby, the control unit 20 controls the mean current value of the current I2 in the combined period that corresponds to the sum of the periods T1 and period T2. Further, when the control unit 20 performs the control based on the current value I1*a* (the first charging current value) of the current I1 that is detected as the first current value by the current detection unit 18 and flows in from the first DC voltage line L1 in the period T1 in the intermittent operation mode during the charging operation, the control unit 20 controls the mean current value of the current I1 in the combined period that corresponds to the sum of the period T1 and period T2 while the current value I1*a* (the first charging current value) in the period T1 is maintained to be the optimum value (for instance, 1 A) at the time of charging. Therefore, with respect to the bidirectional DC-DC converter 1, the efficiency of the bidirectional DC-DC converter 1 can be further improved.

Further, in the bidirectional DC-DC converter 1, when the control unit 20 performs the control based on the current value I2*a* (the second discharging current value) of the current I2 that is detected as the second current value by the current detection unit 19 and flows in from the second DC voltage line L2 in the period T1 in the intermittent operation mode during the discharging operation, the control unit 20 controls the ratio of the lengths of the period T1 and the period T2 and drives each of the switching elements 31 and 32 while the current value I2*a* (the second discharging current value) of the current I2 is maintained to be the current value (3.8 A) that makes the efficiency of power conversion of the bidirectional DC-DC converter 1 the most at the discharging operation. Thereby, the control unit 20 controls the mean current value of the current I2 in the combined period that corresponds to the sum of the periods T1 and period T2. Further, when the control unit 20 performs the control based on the current value I1*a* (the first discharging current value) of the current I1 that is detected as the second current value by the current detection unit 18 and flows out to the first DC voltage line L1 in the period T1 in the intermittent operation mode during the discharging operation, the control unit 20 controls the mean current value of the current I1 in the combined period that corresponds to the sum of the period T1 and period T2 while the current value I1*a* (the first discharging current value) in the period T1 is maintained to be the optimum value (for instance, 1 A) at the time of discharging. Therefore, with respect to the bidirectional DC-DC converter 1, the efficiency of the bidirectional DC-DC converter 1 can be further improved.

Further, in the bidirectional DC-DC converter 1, when the control unit 20 performs the control based on the current value I2*a* (the second charging current value) of the current I2 that is detected as the first current value by the current detection unit 19 and flows out to the second DC voltage line L2 during the charging operation, the control unit 20 shifts to the intermittent operation mode (the control unit 20 intermittently performs the switching control operation) because of a light load operation state starting from when the current value I2*a* is equal to or lower than a predetermined first threshold value Ith1, which is regulated for the current value I2*a*, until reaching or exceeding a predetermined second threshold value Ith2, which is larger than the predetermined first threshold value Ith1. Further, when the control unit 20 performs the control based on the current value I1*a* (the first charging current value) of the current I1 that is detected as the first current value by the current detection unit 18 and flows in from the first DC voltage line L1 during the charging operation, the control unit 20 shifts to the intermittent operation mode (the control unit 20 intermittently performs the switching control operation) because of the light load operation state starting from when the current value I1*a* is equal to or lower than a predetermined first threshold value Ith1, which is regulated for the current value I1*a*, until reaching or exceeding a predetermined second threshold value Ith2, which is larger than the predetermined first threshold value Ith1. The configuration of the bidirectional DC-DC converter 1 is different from a configuration in which a mode is shifted to the intermittent operation mode based on one threshold value. Therefore, even though the current value I2*a* of the current I2 during the charging operation is up and down while it is varying (with respect to the control based on the current value I1*a*, even though the current value I1*a* of the current I1 during the charging operation is up and down while it is varying), it is possible to securely avoid an oscillation state in which the control unit 20 alternatively performs the normal switching control operation and the intermittent switching control operation in a short period of time. As a result, transmission of the DC power from the first DC voltage line to the second DC voltage line is stably performed.

Further, in the bidirectional DC-DC converter 1, when the control unit 20 performs the control based on the current value I2a (the second discharging current value) 12a of the current I2 that is detected as the second current value by the current detection unit 19 and flows in from the second DC voltage line L2 during the discharging operation, the control unit 20 shifts to the intermittent operation mode (the control unit 20 intermittently performs the switching control operation) because of a light load operation state starting from when the current value I2a is equal to or lower than a predetermined third threshold value Ith3, which is regulated for the current value I2a, until reaching or exceeding a predetermined fourth threshold value Ith4, which is larger than the predetermined third threshold value Ith3. Further, when the control unit 20 performs the control based on the current value I1a (the first discharging current value) of the current I1 that is detected as the second current value by the current detection unit 18 and flows out to the first DC voltage line L1 during the discharging operation, the control unit 20 shifts to the intermittent operation mode (the control unit 20 intermittently performs the switching control operation) because of the light load operation state starting from when the current value I1a is equal to or lower than a predetermined third threshold value Ith3, which is regulated for the current value I1a, until reaching or exceeding a predetermined fourth threshold value Ith4, which is larger than the predetermined third threshold value Ith3. The configuration of the bidirectional DC-DC converter 1 is different from a configuration in which a mode is shifted to the intermittent operation mode based on one threshold value. Therefore, even though the current value I2a of the current I2 during the discharging operation is up and down while it is varying (with respect to the control based on the current value I1a, even though the current value I1a of the current I1 during the discharging operation is up and down while it is varying), it is possible to securely avoid an oscillation state in which the control unit 20 alternatively performs the normal switching control operation and the intermittent switching control operation in a short period of time. As a result, transmission of the DC power from the first DC voltage line to the second DC voltage line is stably performed.

Further, when an improvement of the efficiency that is obtained by adopting the configuration of shifting to the intermittent operation mode, the present invention should not be limited to the configuration in which the current value I2a of the current I2 (or the current value I1a of the current I1) in the period T1 of the intermittent operation mode during the charging operation is regulated as the current value that makes the efficiency of power conversion of the bidirectional DC-DC converter 1 improve the most and in which the current value I2a of the current I2 (or the current value I1a of the current I1) in the period T1 of the intermittent operation mode during the discharging operation is regulated as the current value that makes the efficiency of power conversion of the bidirectional DC-DC converter 1 improve the most. The present invention can also adopt a configuration in which the current value I2a of the current I2 in the period T1 and the current value I1a of the current I1 in the period T1 are regulated as any current value (for instance, any current value within a range where a desired efficiency can be obtained) except for the current value that makes the efficiency of power conversion improve the most.

Further, in the bidirectional DC-DC converter 1 as discussed above, the second DC-AC converter 15 is configured with the switching elements 31 and 32. However, the second DC-AC converter 15 can also have a configuration of a full bridge form that is the same configuration as the first DC-AC converter 14 by combining the second windings 13b of transformer 13 into one winding (not shown). Further, the configuration, in which each of the gate driving signals Sa-Sd and the gate driving signals S1 and S2 for each of the switching elements 21-24 and the switching elements 31 and 32 of the first DC-AC converter 14 and the second DC-AC converter 15, respectively, are generated and output by the PWM method, is adopted. However, a configuration in which those signals are generated by a PFM (pulse frequency modulation) method can also be adopted (not shown).

Further, MOSFETs are used as the switching elements 21-24, 31 and 32. However, a bipolar transistor in which a body diode is connected in parallel can also be used and IGBT (insulated gate bipolar transistor) can also be used.

Further, the bidirectional DC-DC converter 1 as explained above is configured with either of the current detection unit 18 or the current detection unit 19. When the bidirectional DC-DC converter 1 has the current detection unit 18, the current detection unit 18 functions as a first current detection unit during the charging operation and detects the current value I2a (the second charging current value) of the current I2 that flows out to the second DC voltage line L2 as the first current value. At the same time, the current detection unit 18 functions as a second current detection unit during the discharging operation and detects the current value I2a (the second discharging current value) of the current I2 that flows in from the second DC voltage line L2 as the second current value. On the other hand, when the bidirectional DC-DC converter 1 has the current detection unit 19, the current detection unit 19 functions as a first current detection unit during the charging operation and detects the current value I1a (the first charging current value) of the current I1 that flows in from the first DC voltage line L1 as the first current value. At the same time, the current detection unit 19 functions as a second current detection unit during the discharging operation and detects the current value I1a (the first discharging current value) of the current I1 that flows out to the first DC voltage line L1 as the second current value. However, a configuration in which the bidirectional DC-DC converter 1 has both the current detection unit 18 and the current detection unit 19 can also be adopted.

In this case, when the current detection unit 19 functions as the first current detection unit during the charging operation and detects the current value I2a (the second charging current value) of the current I2 that flows out to the second DC voltage line L2 as the first current value, the current detection unit 18 functions as the second current detection unit during the discharging operation and detects the current value I1a (the first discharging current value) of the current I1 that flows out to the first DC voltage line L1 as the second current value. Further, in this configuration, the control unit 20 determines whether the light load operation state or not during the charging operation by comparing the current value I2a, which is detected as the first current value, with the first threshold value Ith1 and the second threshold value Ith2, which are regulated for the current value I2a. Similarly, the control unit 20 determines whether the light load operation state or not during the discharging operation by comparing the current value I1a, which is detected as the second current value, with the third threshold value Ith3 and the fourth threshold value Ith4, which are regulated for the current value I1a. On the other hand, when the current detection unit 19 functions as the second current detection unit during the discharging operation and detects the current value I2a (the second charging current value) of the current I2 that flows in from the second DC voltage line L2 as the second current value, the current detection unit 18 functions as the first current detection unit during the charging operation and detects the current value I1a (the first discharging current value) of the current I1 that flows in from the first DC voltage line L1 as the first current value. Further, in this configuration, the control unit 20 determines whether the light load operation state or not during the charging operation by comparing the current value I1a, which is detected as the first current value, with the first threshold value Ith1 and the second threshold value Ith2, which are regulated for the current value I1a. Similarly, the control unit 20 determines whether the light load operation state or not during the discharging operation by comparing the current value I2a, which is detected as the second current value, with the third threshold value Ith3 and the fourth threshold value Ith4, which are regulated for the current value I2a.

Further, there is a low possibility that the oscillation state as explained above occurs even though only one threshold value is used for shifting a mode to the intermittent operation mode or shifting from the intermittent operation mode to the normal operation mode in the following conditions: a configuration in which the current value I2a (the first current value) of the current I2 during the charging operation or the current value I2a (the second current value) of the current I2 during the discharging operation decreases or increases with almost no change; or a configuration in which the current value I1a (the first current value) of the current I1 during the charging operation or the current value I1a (the second current value) of the current I1 during the discharging operation decreases or increases with almost no change. Therefore, in this case, the shift between the normal operation mode and the intermittent operation mode may be performed based on the above first threshold value Ith1 during the charging operation and based on the above third threshold value Ith3 during the discharging operation. In other words, when a current value is equal to or lower than the first threshold value Ith1 during the charging operation, a mode is shifted to the intermittent operation mode. In contrast, when a current value is more than the first threshold value Ith1 during the charging operation, a mode is shifted to the normal operation mode. Similarly, when a current value is equal to or lower than the third threshold value Ith3 during the discharging operation, a mode is shifted to the intermittent operation mode. In contrast, when a current value is more than the third threshold value Ith3 during the discharging operation, a mode is shifted to the normal operation mode.

Further, with respect to the bidirectional DC-DC converter 1 as explained above, during both the charging operation and the discharging operation, the control is performed by the switching operations of the switching elements 21-24 in the first DC-AC converter 14 and the switching elements 31 and 32 in the second DC-AC converter 15. However, the following configuration can also be adopted: during the charging operation, the switching operation for only the switching elements 21-24 of the first DC-AC converter 14 is performed, and the switching elements 31 and 31 of the second DC-AC converter 15 maintain OFF states; and during the discharging operation, the switching operation for only the switching elements 31 and 32 of the second DC-AC converter 15 is performed, and the switching elements 21-24 of the first DC-AC converter 14 maintain OFF states. In this configuration, the DC power can be transmitted from the first DC voltage line L1 to the second DC voltage line L2 and from the second DC voltage line L2 to the first DC voltage line L1. In other words, the bidirectional transmissions of the DC power are possible. Therefore, when the above current I2 (or the current I1) becomes low (when the current is equal to or lower than the threshold value), the efficiency of the converter can be improved by shifting from the normal operation mode to the intermittent operation mode.

The bidirectional DC-DC converter and the method of controlling the bidirectional DC-DC converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A bidirectional DC-DC converter, comprising:
   a transformer that has a first winding and a second winding;
   a first DC-AC converter that is provided between a first DC voltage line and the first winding;
   a second DC-AC converter that is provided between a second DC voltage line and the second winding; and
   a controller that performs a switching control operation that bidirectionally transmits DC power between the first DC voltage line and the second DC voltage line, wherein
   when the bidirectional DC-DC converter is in a light load operation state, the controller provides an operation stop period that periodically stops the switching control operation so as to perform an intermittent switching control operation,
   the intermittent switching control operation has the operation stop period and an operation performance period that performs the switching control operation, and
   when the controller performs the intermittent switching control operation, the controller maintains a detection current value as a first predetermined value and controls an average current value of the detection current value during the intermittent switching control operation by adjusting a time ratio of the operation stop period and the operation performance period.

2. The bidirectional DC-DC converter according to claim 1, wherein
   the controller determines that the bidirectional DC-DC converter is in the light load operation state when the detection current value is lower than a second predetermined value, the detection current value being one of the group consisting of: a first current flowing in from the first DC voltage line, a second current flowing out to the first DC voltage line, a third current flowing in from the second DC voltage line, and a fourth current flowing out to the second DC voltage line.

3. The bidirectional DC-DC converter according to claim 1, wherein the switching control operation comprising:
   when the DC power is transmitted from the first DC voltage line to the second DC voltage line, the first DC-AC converter performs a first switching operation so as to convert a first DC voltage from the first DC voltage line to a first AC voltage and output the first AC voltage to the first winding and the second DC-AC converter performs a first rectifying operation so as to convert a second AC voltage, which is generated at the second winding according to the first AC voltage at the first winding, to a second DC voltage and output the second DC voltage to the second DC voltage line; and when the DC power is transmitted from the second DC voltage line to the first DC voltage line, the second DC-AC converter performs a second switching operation so as to convert a third DC voltage from the second DC voltage line to a first AC current and output the first AC current to the second winding and the first DC-AC converter performs a second rectifying operation so as to convert a second AC current, which is generated at the first winding according to the first AC current at the second winding, to a fourth DC voltage and output the fourth DC voltage to the first DC voltage line.

4. The bidirectional DC-DC converter according to claim 1, further comprising:
a first current detection unit that detects a first current value, the first current value being one of the group consisting of: a current flowing in from the first DC voltage line and a current flowing out to the second DC voltage line, wherein
when the first current value is equal to or lower than a first threshold value until reaching or exceeding a second threshold value, which is larger than the first threshold value, the controller determines that the bidirectional DC-DC converter is in the light load operation state and performs the intermittent switching control operation.

5. The bidirectional DC-DC converter according to claim 4, further comprising:
a second current detection unit that detects a second current value, the second current value being one of the group consisting of: a current flowing out to the first DC voltage line and a current flowing in from the second DC voltage line, wherein
when the second current value is equal to or lower than a third threshold value until reaching or exceeding a fourth threshold value, which is larger than the third threshold value, the controller determines that the bidirectional DC-DC converter is in the light load operation state and performs the intermittent switching control operation.

6. The bidirectional DC-DC converter according to claim 1, further comprising:
a current detection unit that detects a current value, the current value being one of the group consisting of: a current flowing out to the first DC voltage line and a current flowing in from the second DC voltage line, wherein
when the current value is equal to or lower than a first threshold value until reaching or exceeding a second threshold value, which is larger than the first threshold value, the controller determines that the bidirectional DC-DC converter is in the light load operation state and performs the intermittent switching control operation.

7. The bidirectional DC-DC converter according to claim 1, further comprising:
a first current detection unit selected from one of the group consisting of: a current detection unit that detects current values of a current flowing in from the first DC voltage line and a current flowing out to the first DC voltage line and a current detection unit that detects current values of a current flowing in from the second DC voltage line and a current flowing out to the second voltage line, wherein
when one of the current values detected by the first current detection unit is equal to or lower than a first threshold value until reaching or exceeding a second threshold value, which is larger than the first threshold value, the controller determines that the bidirectional DC-DC converter is in the light load operation state and performs the intermittent switching control operation.

8. A method of controlling a bidirectional DC-DC converter including a transformer that has a first winding and a second winding, a first DC-AC converter that is provided between a first DC voltage line and the first winding, and a second DC-AC converter that is provided between a second DC voltage line and the second winding, the method comprising:
performing a switching control operation that bidirectionally transmits DC power between the first DC voltage line and the second DC voltage line,
wherein, when the bidirectional DC-DC converter is in a light load operation state, an operation stop period is provided that periodically stops the switching control operation so as to perform an intermittent switching control operation,
the intermittent switching control operation has the operation stop period and an operation performance period that performs the switching control operation, and
in the intermittent switching control operation, a detection current value is maintained as a first predetermined value and an average current value of the detection current value is controlled during the intermittent switching control operation by adjusting a time ratio of the operation stop period and the operation performance period.

9. The method according to claim 8, wherein
determining the light load operation state when the detection current value is lower than a second predetermined value, the detection current value being one of the group consisting of: a first current flowing in from the first DC voltage line, a second current flowing out to the first DC voltage line, a third current flowing in from the second DC voltage line, and a fourth current flowing out to the second DC voltage line.

10. The method according to claim 8, wherein the switching control operation comprising:
when the DC power is transmitted from the first DC voltage line to the second DC voltage line, the first DC-AC converter performs a first switching operation so as to convert a first DC voltage from the first DC voltage line to a first AC voltage and output the first AC voltage to the first winding and the second DC-AC converter performs a first rectifying operation so as to convert a second AC voltage, which is generated at the second winding according to the first AC voltage at the first winding, to a second DC voltage and output the second DC voltage to the second DC voltage line; and
when the DC power is transmitted from the second DC voltage line to the first DC voltage line, the second DC-AC converter performs a second switching operation so as to convert a third DC voltage from the second DC voltage line to a first AC current and output the first AC current to the second winding and the first DC-AC converter performs a second rectifying operation so as to convert a second AC current, which is generated at the first winding according to the first AC current at the second winding, to a fourth DC voltage and output the fourth DC voltage to the first DC voltage line.

11. The method according to claim 8, further comprising:
detecting a first current value, the first current value being one of the group consisting of: a current flowing in from the first DC voltage line and a current flowing out to the second DC voltage line, wherein
when the first current value is equal to or lower than a first threshold value until reaching or exceeding a second threshold value, which is larger than the first threshold value, the bidirectional DC-DC converter is determined to be in the light load operation state and the intermittent switching control operation is performed.

12. The method according to claim 11, further comprising:
detecting a second current value, the second current value being one of the group consisting of: a current flowing out to the first DC voltage line and a current flowing in from the second DC voltage line, wherein when the second current value is equal to or lower than a third threshold value until reaching or exceeding a fourth threshold value, which is larger than the third threshold value, the bidirectional DC-DC converter is determined to be in the light load operation state and the intermittent switching control operation is performed.

13. The method according to claim 8, further comprising:
detecting a current value, the current value being one of the group consisting of: a current flowing out to the first DC voltage line and a current flowing in from the second DC voltage line, wherein when the current value is equal to or lower than a first threshold value until reaching or exceeding a second threshold value, which is larger than the first threshold value, the bidirectional DC-DC converter is determined to be in the light load operation state and the intermittent switching control operation is performed.

14. The method according to claim 8, further comprising:
detecting a first current that is selected from one of the group consisting of: current values of a current flowing in from the first DC voltage line and a current flowing out to the first DC voltage line, and current values of a current flowing in from the second DC voltage line and a current flowing out to the second voltage line, wherein when one of the current values is equal to or lower than a first threshold value until reaching or exceeding a second threshold value, which is larger than the first threshold value, the bidirectional DC-DC converter is determined to be in the light load operation state and the intermittent switching control operation is performed.

* * * * *